(12) United States Patent
Nannen et al.

(10) Patent No.: US 11,114,958 B2
(45) Date of Patent: Sep. 7, 2021

(54) BRAKING METHOD FOR AN ELECTRIC MOTOR

(71) Applicant: Siemens Aktiengesellschaft, Munich (DE)

(72) Inventors: Hauke Nannen, Nuremberg (DE); Heiko Zatocil, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/649,548

(22) PCT Filed: Sep. 25, 2017

(86) PCT No.: PCT/EP2017/074204
§ 371 (c)(1),
(2) Date: Mar. 20, 2020

(87) PCT Pub. No.: WO2019/057309
PCT Pub. Date: Mar. 28, 2019

(65) Prior Publication Data
US 2020/0313580 A1    Oct. 1, 2020

(51) Int. Cl.
*H02P 3/24*    (2006.01)

(52) U.S. Cl.
CPC ..................... *H02P 3/24* (2013.01)

(58) Field of Classification Search
CPC ...... H02P 3/22; H02P 1/00; H02P 1/04; H02P 1/06; H02P 1/10; H02P 1/12; H02P 1/18;
(Continued)

(56) References Cited

U.S. PATENT DOCUMENTS

| 5,003,241 A | 3/1991 | Rowan et al. |
| 8,222,776 B2 * | 7/2012 | Tanaka ............... H02K 23/66 |
| | | 310/67 R |

(Continued)

FOREIGN PATENT DOCUMENTS

| EP | 0512372 A2 | 11/1992 |
| GB | 2491198 A | 11/2012 |
| WO | WO2012/065637 A1 | 5/2012 |
| WO | WO 2015184047 A1 | 12/2015 |
| WO | WO2018/086685 A1 | 5/2018 |

OTHER PUBLICATIONS

Yongchang Zhang et al: "An Improved model predictive current control of permanent magnet synchronous motor drives", 2016 IEEE Applied Power Electronics Conference and Exposition (APEC), IEEE, pp. 2866-2874, XP032899183, DOI: 10.1109/APEC.2016. 746827; ISBN: 987-1-4673-8393-6 (2018Q12510).

(Continued)

*Primary Examiner* — Antony M Paul
(74) *Attorney, Agent, or Firm* — Henry M. Feiereisen LLC

(57) ABSTRACT

An electric motor connected to a switching device is braked from an active operating state by actuating a semiconductor switch arranged in parallel with an electromechanical switch to reduce a current intensity in the electromechanical switch, opening the electromechanical switch, blocking the semiconductor switch for an adjustable period, determining a resulting torque of the electric motor, and determining an actuation time for braking the electric motor based on the resulting torque and actuating the semiconductor switch at the actuation time. The resulting torque is opposite a present direction of rotation of the electric motor at the actuation time. The semiconductor switch is turned on for an adjustable actuation period. Also disclosed are a computer program product and a soft starter configured to implement the described method.

14 Claims, 3 Drawing Sheets

(58) Field of Classification Search
CPC .... H02P 1/16; H02P 1/163; H02P 1/22; H02P 1/26; H02P 1/265; H02P 1/28; H02P 1/40; H02P 1/42; H02P 1/46; H02P 3/00; H02P 3/16; H02P 5/00; H02P 6/00; H02P 6/005; H02P 6/04; H02P 6/08; H02P 6/182; H02P 6/20; H02P 6/28; H02P 15/00; H02P 12/00; H02P 21/0021; H02P 21/04; H02P 21/22; H02P 23/06; H02P 23/10; H02P 25/08; H02P 25/105; H02P 25/14; H02P 27/00
USPC ................................ 318/362, 372, 374, 375
See application file for complete search history.

(56) References Cited

U.S. PATENT DOCUMENTS

| | | | |
|---|---|---|---|
| 9,035,584 B2 * | 5/2015 | Cameron | H02M 7/5395 |
| | | | 318/400.09 |
| 10,056,851 B2 * | 8/2018 | Wu | H02P 23/14 |
| 2019/0267921 A1 | 8/2019 | Nannen et al. | |

OTHER PUBLICATIONS

"PCT International Search Report and Written Opinion of International Searching Authority dated Aug. 6, 2018 corresponding to PCT International Application No. PCT/EP2017/074204 filed Sep. 25, 2017".

* cited by examiner

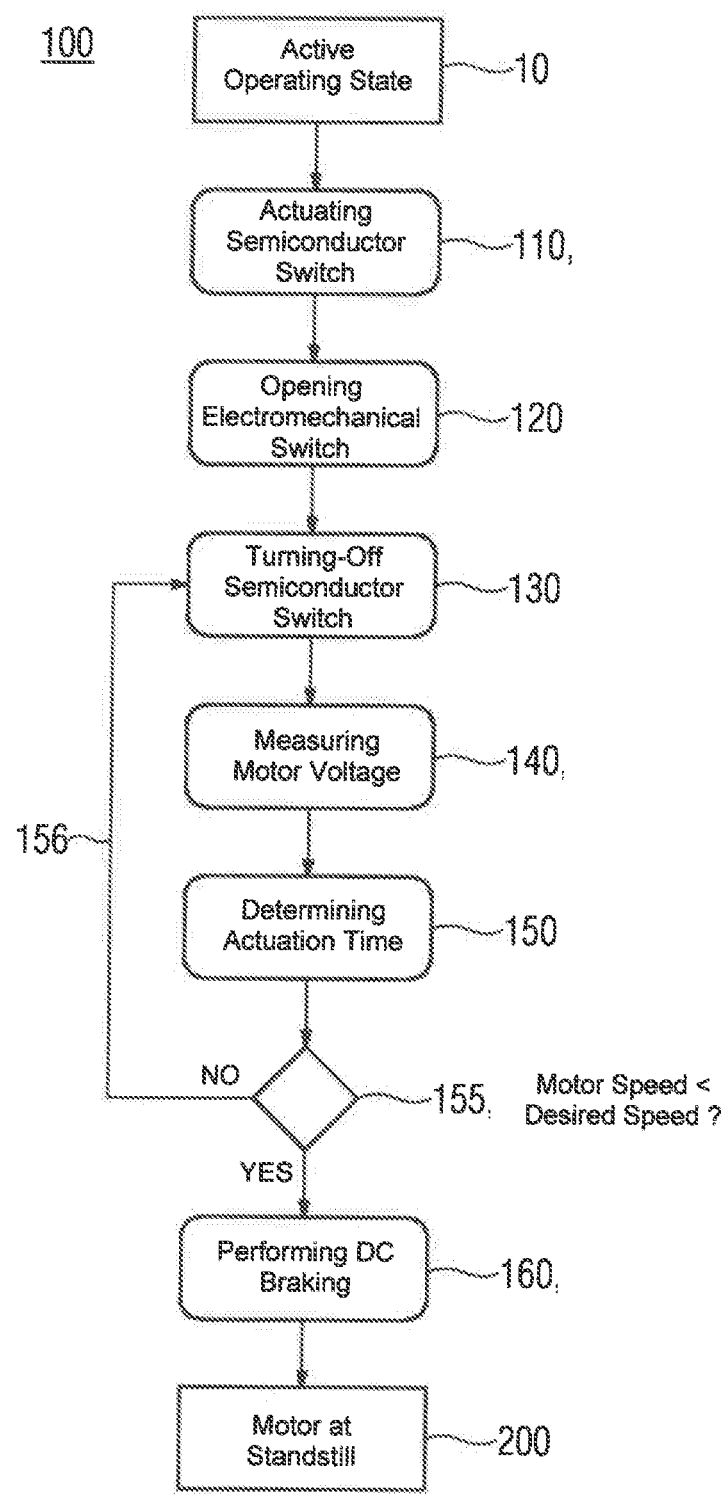

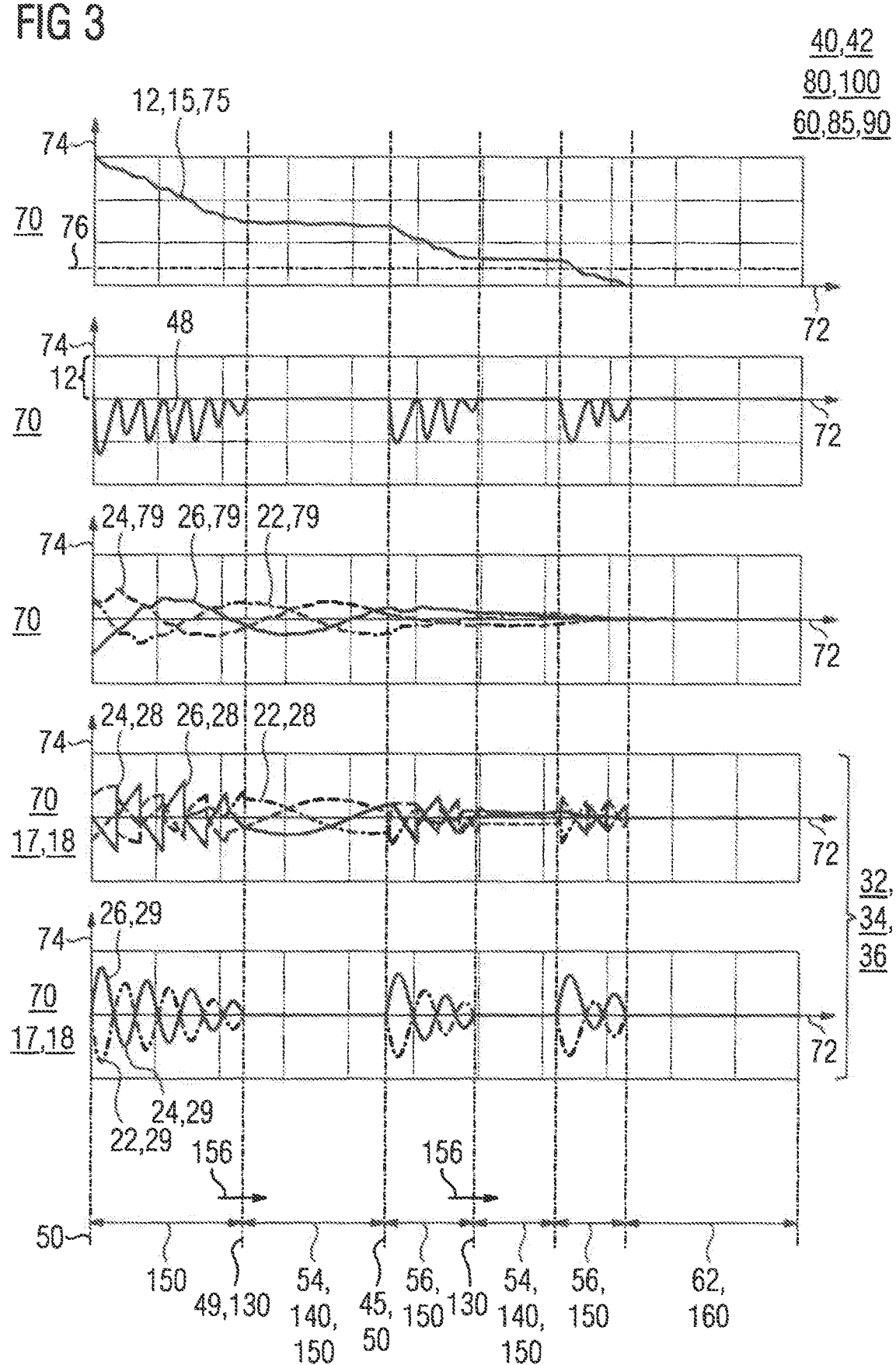

BRAKING METHOD FOR AN ELECTRIC MOTOR

CROSS-REFERENCES TO RELATED APPLICATIONS

This application is the U.S. National Stage of International Application No. PCT/EP2017/074204 filed Sep. 25, 2017, which designated the United States and has been published as International Publication No. WO 2019/057309 A1.

BACKGROUND OF THE INVENTION

The invention relates to a method for braking an electric motor and to a computer program product for implementing the method. The invention also relates to a system comprising two computer program products which interact in order to carry out the method. The invention likewise relates to a soft starter and to an electric motor arrangement in which the method according to the invention is implemented.

WO 2012/065637 A1 discloses a method for ending a braking operation of a three-phase motor. For braking, a first thyristor and a second thyristor are controlled in such a manner that a braking current is caused. During the braking operation, the braking current is adopted by the second thyristor after the first thyristor has been turned off.

The previously unpublished international application PCT/EP2016/077201 discloses a method for determining an electromotive force based on capturing a voltage of an electric motor. The determination of the electromotive force is used to start the electric motor and ensures energy-efficient starting.

In numerous fields of application, for example in hydraulics or materials-handling technology, operating situations which require an electric motor to be stopped quickly can arise in installations. Known methods for stopping an electric motor, for example according to stop category 0, comprise interrupting the power supply to the electric motor, which results in so-called coasting of the electric motor. However, undesirable activity of the electric motor is still present during coasting. There is a need for a method for rapidly braking an electric motor, which method operates reliably, can be implemented with little effort and can also be easily retrofitted in existing installations.

This object is achieved by means of the method according to the invention for braking an electric motor. The method is based on an electric motor which is in an active operating state and is connected to a power supply via a switching device, in particular a soft starter. The switching device has at least one semiconductor switch, in parallel with which an electromechanical switch is arranged in one phase for supplying power to the electric motor. In the active operating state, the semiconductor switch is inactive and the electromechanical switch is closed, with the result that the current flows to the electric motor solely via the electromechanical switch. In a first step, the semiconductor switch is actuated and is turned on. As a result, a part of the current present in the corresponding phase is now conducted through the semiconductor switch and the electromechanical switch at the same time. A current intensity present in the electromechanical switch arranged in a parallel manner is therefore reduced. In a further step, the electromechanical switch arranged in a parallel manner is opened. Consequently, the current present in the phase is now conducted solely via the semiconductor switch. In a further step, an off state of the semiconductor switch is caused for an adjustable period. During the adjustable period, an electromotive force corresponding to a voltage induced by the electric motor is determined. The determination of the electromotive force is based, inter alia, on a captured motor terminal voltage. A resulting torque present at a future time is determined on the basis of the electromotive force. In this case, the period is adjustable by means of a user input, a computer program product and/or a superordinate control device. The determination of the resulting torque comprises quantitatively determining and also determining the sign of the resulting torque. A resulting torque with a negative sign is opposite the direction of rotation of the electric motor in the active operating state. The determination of the resulting torque or of the electromotive force is based on the corresponding method described in the previously unpublished international application PCT/EP2016/077201. The disclosure content of PCT/EP2016/077201 is incorporated in the present application by reference.

In a further step, an actuation time which is suitable for braking the electric motor, that is to say an actuation time at which the present electromotive force causes a resulting torque which is opposite the direction of rotation of the electric motor, is determined for the semiconductor switch. The actuation turns on the semiconductor switch, with the result that the resulting torque is established at the electric motor.

The method according to the invention provides an increased braking torque and thus ensures fast braking of the electric motor. Furthermore, the braking resulting torque is also adjustable on the basis of further specifications, for example a maximum braking deceleration of the electric motor. In this case, the maximum current intensity in a current-carrying phase is also adjustable during the braking operation, with the result that overloading of the electric motor or of its lines is avoided. In addition, the method according to the invention manages without additional hardware and can readily also be implemented in existing soft starters.

In one embodiment of the claimed method, the semiconductor switch is turned on for an adjustable actuation period. In this case, the adjustable actuation period preferably corresponds to a period during which, after the actuation time, an electromotive force is continuously present, which force is suitable for causing a resulting torque which is opposite the direction of rotation of the electric motor. This period is concomitantly calculated when calculating the electromotive force.

The actuation time preferably substantially corresponds to the time after which an electromotive force is present, which force is suitable for causing a resulting torque which is opposite the direction of rotation of the electric motor. The corresponding choice of the actuation time and/or of the subsequent actuation period is the period in which a braking resulting torque can be achieved can be used to the greatest possible extent. Consequently, more effective braking of the electric motor is achieved by means of the claimed method.

Furthermore, in the claimed method, the actuation time can be determined by means of an algorithm or on the basis of a table of values. An algorithm and a table of values can likewise also be used in combination for this purpose. An algorithm allows the actuation time to be determined exactly with an increased resolution for each captured motor terminal voltage. A table of values makes it possible to reduce the necessary computing complexity and to quickly assign an actuation time to each value of the motor terminal voltage. Consequently, the claimed method can also be carried out using simple hardware with reduced computing power.

In a further embodiment of the claimed method, the capture of the electromotive force of the electric motor and/or the determination of an actuation time and/or the actuation of the at least one semiconductor switch are carried out repeatedly. For example, after braking for the first time by means of the at least one semiconductor switch, it is possible to determine a suitable actuation time again, at which the electric motor is braked again in the same manner. The outlined steps are preferably repeated individually or in combination until the present speed of the electric motor undershoots an adjustable desired speed. In this case, the desired speed is adjustable by means of a user input, a computer program product and/or a superordinate control device.

After the described method steps have been repeatedly carried out, it is possible to additionally actuate only the semiconductor switches in a phase pair with a selectable constant ignition angle below the desired speed in the electric motor, and the electric motor is therefore decelerated further. The ignition angle remains constant for the semiconductor switches for a braking operation and can be selected, for example, by means of a user input via the internal and/or superordinate control unit. This form of braking is a reliable braking method which can be easily carried out and provides an increased braking effect at reduced speeds. Such a braking operation is referred to as DC braking below.

In a further embodiment of the claimed method, the electric motor is in the form of a permanent magnet synchronous motor, PMSM for short. PMSM ensure a high degree of energy efficiency. The electric motor is particularly preferably in the form of a PMSM with a starting cage. The application of the claimed method to a PMSM allows its energy efficiency to be retained even in previously inefficient operating states, for example in the case of deceleration. In particular, the energy efficiency is thus improved over an increased range of operating states.

Furthermore, the at least one semiconductor switch can be in the form of a thyristor or a thyristor pair. The semiconductor switch can likewise be understood as meaning any semiconductor-based switching element which is able to be changed over between an off state and an on state by means of an actuation command. A thyristor pair as a semiconductor switch achieves a particularly high degree of dielectric strength, reliability and actuation speed. In a switching device having a plurality of semiconductor switches, for example in three-phase soft starters, the semiconductor switches may be both of the same type and a combination of a plurality of the different types outlined.

The object described above is also achieved by means of the computer program product according to the invention. The computer program product is designed for storage and execution in a memory of a switching device and/or a superordinate control device. The switching device is a soft starter, for example. A superordinate control device should be understood as meaning, for example, a programmable logic controller, an installation master computer, a handheld device or a computer cloud. The computer program product is designed, in interaction with the switching device and/or the superordinate control device, to output actuation commands to at least one semiconductor switch. The computer program product is likewise designed, in interaction with the switching device and/or the superordinate control device, to receive and process measured values, in particular for determining a motor terminal voltage of an electric motor. Starting from the measured values, the processing comprises in this case determining an actuation time for at least one semiconductor switch or separate actuation times for a plurality of semiconductor switches in the switching device. According to the invention, the computer program product is designed to implement at least one of the methods outlined above and to thus brake an electric motor from an active operating state. The computer program product is also designed to receive and implement inputs relating to the adjustment of the method. This comprises the period for which the at least one semiconductor switch is turned off and/or the desired speed up to which the described method is to be repeated and/or the period for which the at least one semiconductor switch is turned on by the actuation after the actuation time. The computer program product implements the claimed method, with the result that the individual features of the computer program product can be readily combined with the features of the described method.

The object outlined is likewise achieved by the system of computer program products according to the invention. The system comprises at least two computer program products which communicatively interact with one another. A first computer program product is stored in an executable manner in a switching device and a second computer program product is stored in an executable manner in a superordinate control device. According to the invention, the first and second computer program products interact in such a manner that at least one of the methods described above is implemented. For this purpose, functions and/or steps of the claimed method are divided between the first and second computer program products and coupled to one another by means of suitable interfaces. The system according to the invention therefore substantially applies embodiments of the computer program product described above in combination to an electric motor. The features of the computer program product according to the invention can therefore be applied to the first and second computer program products of the system.

In one preferred embodiment of the claimed system, the superordinate control device is in the form of a programmable logic controller, PLC for short, an installation master computer, a handheld device, in particular a parameterizing device, or a computer cloud. The superordinate control device can also be in the form of a component of an additional soft starter which carries out a control function for other soft starters. The computer program product described can consequently be used on a multiplicity of hardware platforms, with the result that there is a high degree of adaptability when designing an electric motor arrangement.

The underlying object is likewise achieved by means of a soft starter according to the invention which is designed to control an electric motor. The soft starter actuates at least one current-carrying phase in which a semiconductor switch is arranged. In addition to the semiconductor switch, the soft starter also comprises an electromechanical switch which is connected in parallel with the semiconductor switch. The soft starter also has an internal control unit which is designed to output actuation commands to the semiconductor switch and the associated electromechanical switch. The internal control unit can also be coupled to a superordinate control device. According to the invention, a computer program product which is designed to implement at least one of the methods outlined above on the soft starter is stored in an executable manner in a memory of the soft starter. This allows overall individual functions and/or steps of the underlying method to be expediently located on different hardware platforms and to interact with one another.

The described object is likewise achieved by means of the electric motor arrangement according to the invention which is designed to control an electric motor belonging to the electric motor arrangement. In addition to the electric motor, the electric motor arrangement according to the invention comprises a soft starter having a memory. The memory is designed to store a first computer product in an executable manner. The soft starter is also communicatively connected to a superordinate control device which likewise has a memory. The memory of the superordinate control device is designed to store a second computer program product in an executable manner. According to the invention, the two computer program products interact as a system, as described above. Such an electric motor arrangement allows the electric motor which is used to be braked quickly, in which case the braking operation provides a high degree of energy efficiency. The method required for the braking operation likewise requires a minimum of hardware outlay since it is based substantially on hardware components which are present in a soft starter anyway. As a result, an existing electric motor arrangement can be easily and quickly retrofitted with a corresponding soft starter and/or the loading of a suitable computer program product or system of computer program products in order to thus implement the corresponding method.

BRIEF DESCRIPTION OF THE DRAWING

The invention is described below on the basis of figures of individual embodiments. The features of the figures can be readily combined with one another in this case. In the figures, in detail:

FIG. 2 shows a flowchart of a first embodiment of the claimed method;

FIG. 3 shows a sequence of individual method steps of an embodiment of the claimed method.

DETAILED DESCRIPTION OF PREFERRED EMBODIMENTS

Figure 1:
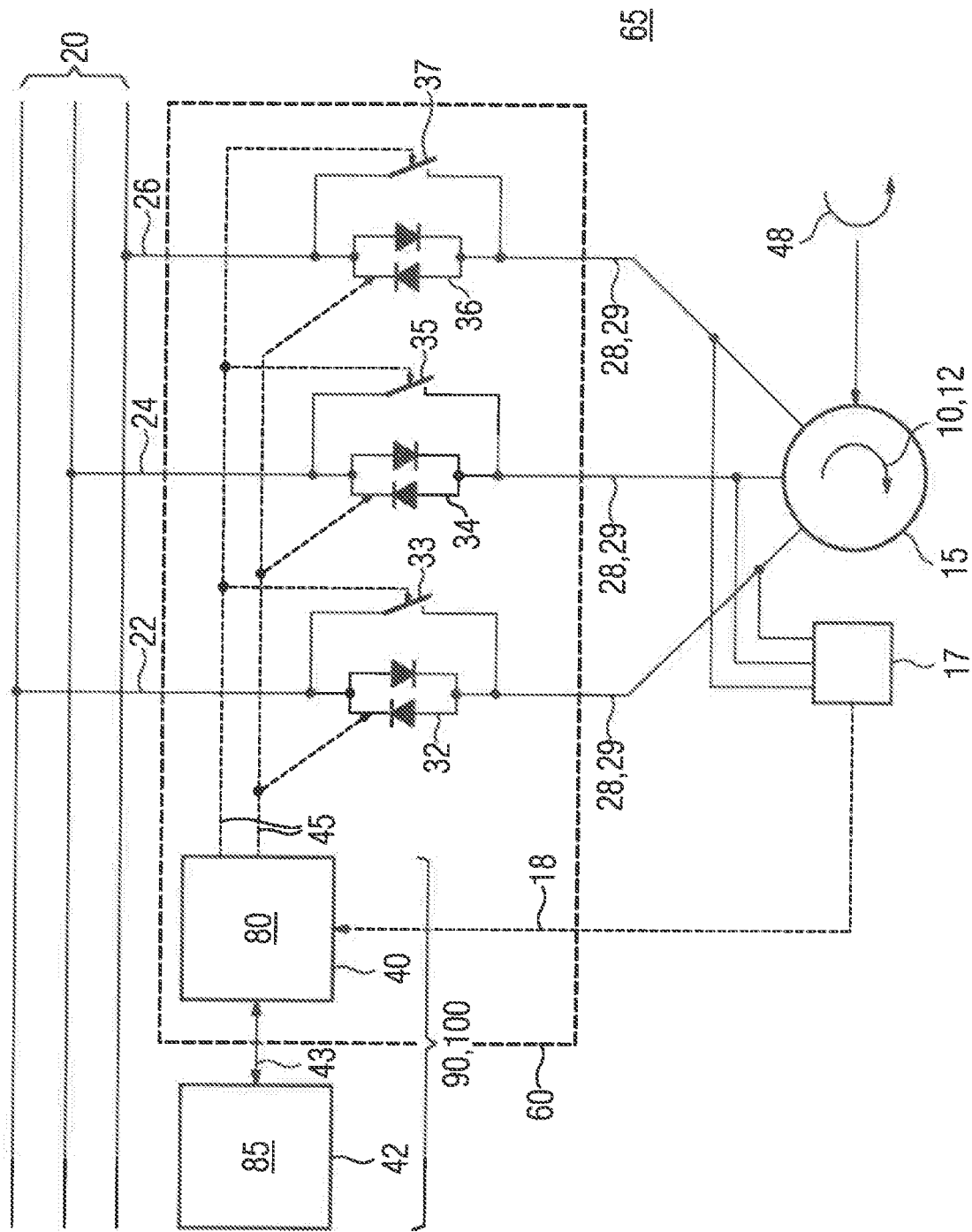
FIG. 1 schematically shows the structure of an embodiment of the claimed electric motor arrangement, to which the method according to the invention can be applied.

FIG. 1 schematically illustrates the structure of an electric motor arrangement 65, to which at least one embodiment of the method 100 according to the invention can be applied. An electric motor 15, which is in the form of a permanent magnet synchronous motor, is coupled to a three-phase power supply 20 via a soft starter 60. The soft starter 60 is respectively coupled to the individual phases 22, 24, 26 which are in turn connected to individual motor windings of the electric motor 15. A semiconductor switch 32, 34, 36 is arranged in each phase 22, 24, 26 and is designed to interrupt a current flow in one of the phases 22, 24, 26 from the three-phase power supply 20 to the electric motor 15. The semiconductor switches 22, 24, 26 are in the form of pairs of anti-parallel thyristors in FIG. 1. An electromechanical switch 33, 35, 37 is assigned to each semiconductor switch 32, 34, 36 in the respective phase 22, 24, 26. A semiconductor switch 32, 34, 36 can be bridged by one electromechanical switch 33, 35, 37 in each case. The soft starter 60 has an internal control unit 40 which is designed to output actuation commands 45 to the semiconductor switches 32, 34, 36. This makes it possible to implement, for example, phase gating control or phase chopping control. The internal control unit 40 is also designed to output actuation commands 45 to the electromechanical switches 33, 35, 37. The actuation commands 45 are determined by a first computer program product 80 which is stored in an executable manner in a memory of the internal control unit 40. As a result, the internal control unit 40 is suitable for separately actuating each electromechanical switch 33, 35, 37 and each semiconductor switch 32, 34, 36. The electric motor arrangement 65 also has a measuring apparatus 17 which is coupled to the electric motor 15. The measuring apparatus 17 is designed to separately measure physical variables for the phases 22, 24, 26. Specifically, an available motor terminal voltage 28 and an available motor current 29 can be determined by the measuring apparatus 17 in each phase 22, 24, 26. The described variables, that is to say motor terminal voltages 28 and motor currents 28, are forwarded to the internal control unit 40 as measured values 18. The measured values 18 are used as input values for the method 100 according to the invention which is implemented by means of the first computer program product 80 in the internal control unit 40. The internal control unit 40 is coupled to a superordinate control unit 42 via a communication connection 43. A second computer program product 85 is stored in an executable manner in a memory in the superordinate control unit 42. Data can be interchanged between the first and second computer program products 80, 85 during operation of the soft starter 60 via the communication connection 43. Individual steps and/or functions of the method 100 according to the invention are divided between the first and second computer program products 80, 85. Results of individual steps and/or functions are interchanged by means of the communication connection 43. Overall, the first and second computer program products 80, 85 form a system 90 which is used to implement the method 100 according to the invention on the electric motor arrangement 65.

The method 100 according to the invention starts from an active operating state 10 in which the electric motor 15 rotates at a speed 75 in an operational direction of rotation 12. The direction of rotation 12 is represented by the rotation direction of the arrow 12 in FIG. 1. The method 100 according to the invention causes a resulting torque 48 which brakes the electric motor 15. The braking effect is represented by the opposite rotation direction of the arrow 48 in FIG. 1.

FIG. 2 schematically shows the sequence of an embodiment of the claimed method 100 which is implemented by means of a first computer program product 80. The method 100 starts from an initial state in which an active operating state 10 of an electric motor 15 is present. In this case, the electric motor 15 has an operational direction of rotation 12 at a speed 75. The electric motor 15 is to be braked starting from this. In a first step 110, at least one semiconductor switch 32, 34, 36 in a phase 22, 24, 26 of the electric motor 15 is actuated and is therefore turned on. A current intensity in an electromechanical switch 33, 35, 37 parallel to the at least one semiconductor switch 32, 34, 36 is reduced as a result and arc-free switching is therefore ensured. In a further step 120, the electromechanical switch 33, 35, 37 is opened. Consequently, the at least one semiconductor switch 32, 34, 36 carries the entire motor current 29 which flows through the respective phase 22, 24, 26.

A third step 130 follows, in which the at least one semiconductor switch 32, 34, 36 is turned off for an adjustable period 54. The period 54 in which no current flows through the at least one semiconductor switch 32, 34, 36 is adjusted, for example, by means of a user input via the internal and/or superordinate control unit. During the adjustable period 54, a motor terminal voltage 28 caused by non-driven further rotation of the electric motor 15 is captured in a fourth step 140 by means of the measuring apparatus 17 which is connected to the electric motor 15.

The motor terminal voltage 28 is captured in at least one of the phases 22, 24, 26 used to connect the electric motor 15 to the power supply 20. The captured motor terminal voltage 28 is forwarded to the internal control unit 40 in the form of measured values 18.

During a fifth step 150 of the method 100, an actuation time 50 is determined. For this purpose, a profile of an electromotive force 79 is effected on the basis of the motor terminal voltage 28 determined in at least one phase 22, 24, 26. In this case, the electromotive force 79 corresponds to the force which would act on the electric motor 15 if the semiconductor switch 32, 34, 36 were closed. Depending on the sign of the electromotive force 79, a driving or a braking resulting torque 48 is exerted on the electric motor 15. The profile of the electromotive force 79 after the actuation time 50 is predicted on the basis of the profile of the electromotive force 79 during the adjustable period 54 in which the associated semiconductor switch 32, 34, 36 is turned off. After the actuation time 50, at least one semiconductor switch 32, 34, 26 is turned on and a braking resulting torque 48 is therefore exerted on the electric motor 15. The actuation time 50 is selected in such a manner that a braking resulting torque 48 is exerted for an adjustable actuation period 56 and the speed 75 of the electric motor 15 therefore falls. In this case, the actuation period 56 is dependent on the present speed 75 of the electric motor 15. The higher the speed 75 of the electric motor 15, the longer the actuation period 56 which follows the actuation time 54.

The method 100 is then branched 155, at which a check is carried out in order to determine whether the present speed 75 of the electric motor 15 undershoots an adjustable desired speed 76. If the speed 75 of the electric motor 15 is above the desired speed 76, the method 100 returns 156 to the second method step 120. Proceeding from this, the method 100 is repeated from the second step 120.

If it is captured in the branch 155 that the adjustable desired speed 76 is undershot by the present speed 75, a sixth step 160 is carried out, in which DC braking 62 is carried out. As a result of the DC braking 62, the speed 75 of the electric motor 15 is reduced further until the electric motor 15 comes to a standstill. The end state 200 of the claimed method 100 is reached when the electric motor 15 comes to a standstill.

FIG. 3 schematically shows the progression of a first embodiment of the claimed method 100 using a plurality of graphs 70. The method 100 is implemented by means of a first and a second computer program product 80, 85 which are stored in executable manner in an internal control unit 40 and a superordinate control unit 42 and interact as a system 90. The internal control unit 40 belongs to a soft starter 60 in this case. In the graphs 70, the horizontal axis forms a time axis 72. The vertical axes form variable axes 72 in the graphs 70, on which different measurable or derived variables are plotted in each case. The time axes 72 in the individual graphs 70 are identical, with the result that variables which are vertically below one another in the individual graphs 70 are present at the same time. The graphs 70 show the method 100 for braking an electric motor 15 which is not illustrated in any more detail and has a speed 75 in an operational direction of rotation 12. The method 100 in FIG. 1 starts from the fact that semiconductor switches 32, 34, 36 have already been actuated. At a measurement starting time 49, a current flow through the three phases 22, 24, 26 is interrupted by means of an actuation command 45 for the semiconductor switches 32, 34, 36. As illustrated in the lowermost graph 70 in FIG. 3, there is no longer any motor current 29 in the phases 22, 24, 26 after the measurement starting time 49. The motor currents 29 in the individual phases 22, 24, 26 can be captured by means of a measuring apparatus 17, which interacts with the soft starter 60, and can be transmitted as measured values 18 to the internal control unit 40 of the soft starter 60. The current flow through the phases 32, 34, 36 is interrupted in this case for an adjustable period 54. The length of the adjustable period 54 can be adjusted by means of a user input, for example via the internal control unit 40 of a soft starter 60 and/or a superordinate control unit 42. During the adjustable period 54, a motor terminal voltage 28 in the respective phases 22, 24, 26 of the electric motor 16 is determined. The profile of the motor terminal voltages 28 in the individual phases 22, 24, 26 is illustrated in the second lowest graph 70. The motor terminal voltages 28 of the phases 22, 24, 26 can also each be captured with the measuring apparatus 17 and can be transmitted as measured values 18 to the internal control unit 40 of the soft starter 60.

During the adjustable period 54, an actuation time 50 for at least one semiconductor switch 32, 34, 36 is determined. For this purpose, it is determined, on the basis of the motor terminal voltages 28 in the phases 22, 24, 26, when a semiconductor switch 32, 34, 36 which has been turned on results in a braking resulting torque 48. During the adjustable period 54, the profile of the electromotive force 79 corresponds to the profile of the motor terminal voltages 28, as illustrated in the middle graph 70. The actuation time 50 for the at least one semiconductor switch 32, 34, 36 is determined in such a manner that a resulting torque 48, the orientation of which is opposite the present direction of rotation 12 of the electric motor 15, is present for an adjustable actuation period 56. In the second graph 70, the direction of rotation 12 of the electric motor 15 is illustrated as a positive section of the associated variable axis 72. The resulting torque 48 which is opposite the present direction of rotation 12 is exerted during the method 100 by turning on at least one semiconductor switch 32, 34, 36 for the adjustable actuation period 56. The braking resulting torques 48 are sketched as negative values in the second graph 70. During step 150, the braking resulting torque 48 fluctuates in terms of value and results in a substantially linear fall in the speed 75 of the electric motor 15.

Steps 130, 140, 150 in which the semiconductor switches 32, 34, 36 are turned off, the motor terminal voltage 28 in at least one phase 22, 24, 26 is measured, the electromotive force 79 and the resulting torque 48 are determined and the semiconductor switches 32, 34, 36 are turned on after an actuation time 50, are repeated in FIG. 3. As long as the speed 75 of the electric motor 15 exceeds an adjustable desired speed 76, steps 130, 140, 150 are repeated. As soon as the speed 75 undershoots the adjustable desired speed 76, a step 160 is carried out, in which the electric motor 15 is brought to a standstill by DC braking 62.

The invention claimed is:

1. A method for braking an electric motor connected to a switching device from an active operating state, said method comprising:
   a) actuating at least one semiconductor switch, which is arranged in parallel with an electromechanical switch, to reduce a current intensity in the electromechanical switch;
   b) opening the electromechanical switch;
   c) turning-off the at least one semiconductor switch for an adjustable period;
   d) determining a resulting torque of the electric motor; and e) determining an actuation time for braking the electric motor based on the resulting torque and actuating the at least one semiconductor switch at the actuation time, wherein the resulting torque is opposite a present direction of rotation of the electric motor at the actuation time.

2. The method of claim 1, wherein, in step e), the at least one semiconductor switch is turned on for an adjustable actuation period.

3. The method of claim 1, wherein the actuation time corresponds to a time after which the resulting torque opposite the present direction of rotation is produced for an adjustable minimum period.

4. The method of claim 1, wherein the actuation time is determined based on an algorithm and/or a table of values.

5. The method of claim 1, wherein steps d) and/or e) are repeated until the electric motor reaches an adjustable desired speed.

6. The method of claim 1, wherein the at least one semiconductor switch comprises semiconductor switches arranged in pairs, the method further comprising, in a further step f), actuating the semiconductor switches arranged in pairs with a selectable constant ignition angle for further braking.

7. The method of claim 1, wherein the electric motor is constructed as a permanent magnet synchronous motor.

8. The method of claim 1, wherein the at least one semiconductor switch is implemented as a thyristor or an anti-parallel thyristor pair.

9. A computer program product embodied in a non-transitory computer-readable storage medium and comprising computer commands which, when stored hi a memory of a switching device and executed by the switching device, causes the switching device to output actuation commands to at least one semiconductor switch and to receive and process measured values, by:
   a) actuating the at least one semiconductor switch, which is arranged in parallel with an electromechanical switch, to reduce a current intensity in the electromechanical switch;
   b) opening the electromechanical switch;
   c) turning-off the at least one semiconductor switch for an adjustable period;
   d) determining a resulting torque of the electric motor; and
   e) determining an actuation time for braking the electric motor based on the resulting torque and actuating the at least one semiconductor switch at the actuation time,
   wherein the resulting torque is opposite a present direction of rotation of the electric motor at the actuation time.

10. The computer program product of claim 9, wherein the switching device is a soft starter.

11. A system comprising a first computer program product embodied in a non-transitory computer-readable storage medium and executed in a switching device, and a second computer program product embodied in a non-transitory computer-readable storage medium and executed in a superordinate control device, each of the first and second computer program products comprising computer commands which interact to cause the switching device to output actuation commands to at least one semiconductor switch and to receive and process measured values, by:
   a) actuating at least one semiconductor switch, which is arranged in parallel with an electromechanical switch; to reduce a current intensity in the electromechanical switch;
   b) opening the electromechanical switch;
   c) turning-off the at least one semiconductor switch for an adjustable period;
   d) determining a resulting torque of the electric motor; and
   e) determining an actuation time for braking the electric motor based on the resulting torque and actuating the at least one semiconductor switch at the actuation time,
   wherein the resulting torque is opposite a present direction of rotation of the electric motor at the actuation time.

12. The system of claim 11, wherein the superordinate control device is implemented as a programmable logic controller, an installation master computer, a handheld device or a computer cloud.

13. A soft starter for controlling an electric motor, comprising:
   a semiconductor switch and an electromechanical switch connected in parallel with the semiconductor switch arranged in at least one phase,
   an internal control unit designed to actuate the semiconductor switch and the electromechanical switch, and
   a computer program product embodied in a non-transitory computer-readable storage medium and comprising computer commands which, when stored in a memory of the soft starter and executed by the soft starter, causes the soft starter to output actuation commands to the semiconductor switch and to receive and process measured values, by:
   a) actuating the semiconductor switch, which is arranged in parallel with an electromechanical switch, to reduce a current intensity in the electromechanical switch;
   b) opening the electromechanical switch;
   c) turning-off the at least one semiconductor switch for an adjustable period;
   d) determining a resulting torque of the electric motor; and
   e) determining an actuation time for braking the electric motor based on the resulting torque and actuating the at least one semiconductor switch at the actuation time,
   wherein the resulting torque is opposite a present direction of rotation of the electric motor at the actuation time.

14. An electric motor arrangement, comprising:
   an electric motor; and
   a soft starter connected to the electric motor controlling the electric motor, wherein the soft starter comprises a first memory storing computer commands of a first computer program product embodied in a non-transitory computer-readable storage medium and executing the computer commands, the soft starter being connected to a superordinate control device having a second memory in which a second computer program product embodied in a non-transitory computer-readable storage medium and having computer commands is stored for execution by the superordinate control device, with the first and second computer program products interacting to cause the soft starter to output actuation commands to at least one semiconductor switch and to receive and process measured values, by:
   a) actuating at least one semiconductor switch, which is arranged in parallel with an electromechanical switch, to reduce a current intensity in the electromechanical switch;
   b) opening the electromechanical switch;
   c) turning off the at least one semiconductor switch for an adjustable period;
   d) determining a resulting torque of the electric motor; and e) determining an actuation time for braking the electric motor based on the resulting torque and actuating the at least one semiconductor switch at the actuation time, wherein the resulting torque is opposite a present direction of rotation of the electric motor at the actuation time.

\* \* \* \* \*